Patented Dec. 4, 1923.

1,476,612

UNITED STATES PATENT OFFICE.

FREDERICK C. HITCH, OF BROOKLYN, AND ARNOLD H. PETER, OF NEW YORK, N. Y., ASSIGNORS TO ROYAL BAKING POWDER COMPANY, OF NEW YORK, N. Y., A CORPORATION OF NEW JERSEY.

CONFECTION.

No Drawing. Application filed April 3, 1920. Serial No. 370,979.

*To all whom it may concern:*

Be it known that we, FREDERICK C. HITCH, a citizen of the United States, residing in the borough of Brooklyn, in the county of Kings, in the city of New York, in the State of New York, and ARNOLD H. PETER, a citizen of the Republic of Switzerland, residing in the borough of Manhattan, in the county of New York, in the city of New York, in the State of New York, have invented and discovered new Improvements in a Confection, of which the following is a specification.

The invention relates to a confection and has for its object to provide an article which is characterized by a pleasant flavor and aroma of coffee, palatable and capable of being manufactured at moderate cost and remaining unimpaired through a long period. A further object of the invention in its preferred form is to provide an article having such characteristics which enable it to be either eaten or by the addition of water converted into an acceptable beverage.

In preparing the confection, coffee is roasted and then ground extremely fine. In order to secure proper results, the coffee is ground to an impalpable powder, preferably by mixing with it in the grinding starch, which serves to facilitate the grinding by absorbing oil and to retain the aroma of the coffee, much of which is lost if it is ground alone. The prepared coffee or a powdered extract or very thick liquid extract thereof is then added to glucose syrup which has been warmed over a water bath so that it has become comparatively thin and free-flowing, and these are stirred while warm until a homogeneous mixture is obtained. To this mixture may be added such proportion of milk powder, condensed milk or evaporated milk as may be desired, and in case of such an addition the stirring is continued until the whole is homogeneous. To this mixture a fondant, made preferably by heating together cane sugar and water, is poured while hot and the stirring continued until the whole is homogeneous. The mixture may then be poured into forms and allowed to harden.

The proportions depend largely upon the character of the product desired. Using 75 parts glucose syrup, 20 parts coffee, 20 parts condensed milk and 250 parts fondant gives a product which is hard; the modifications by increasing the proportion of ingredients other than the fondant give products which are less hard; and the omission of or increase in the proportion of milk may be adapted to please the taste. To the mixture may be added nuts or other edible substances, as desired.

We claim:—

1. A confection comprising the substance resulting from grinding coffee mixed with starch to an impalpable powder mixed with glucose syrup, milk and a fondant.

2. A confection comprising the substance resulting from grinding coffee, mixed with starch to an impalpable powder mixed with glucose syrup and a fondant.

3. A confection comprising coffee ground to an impalpable powder, a substance carrying oil expressed in reducing the coffee to the powder, and a fondant.

FREDERICK C. HITCH.
ARNOLD H. PETER.